United States Patent [19]

Calmettes

[11] Patent Number: 4,552,390
[45] Date of Patent: Nov. 12, 1985

[54] CLAMP FITTING FOR PIPES

[75] Inventor: Lionel Calmettes, Ozoir-la-Ferriere, France

[73] Assignee: Etablissements Caillau, Boulogne-Billancourt, France

[21] Appl. No.: 559,217

[22] Filed: Dec. 8, 1983

[30] Foreign Application Priority Data

Nov. 17, 1982 [FR] France ................................ 82 19254

[51] Int. Cl.⁴ ........................ F16L 21/06; B65D 63/00
[52] U.S. Cl. ........................................ 285/420; 24/277
[58] Field of Search ............... 285/420, 382.2; 24/277, 24/278

[56] References Cited

U.S. PATENT DOCUMENTS

| | | | |
|---|---|---|---|
| 720,296 | 2/1903 | Straub ................................... | 24/277 |
| 2,495,796 | 1/1950 | White et al. ...................... | 24/277 X |
| 2,993,255 | 7/1961 | Jagiel .............................. | 285/420 X |
| 3,055,072 | 9/1962 | Brown .................................. | 24/277 |
| 4,015,313 | 4/1977 | Oldford ................................ | 24/277 |
| 4,229,863 | 10/1980 | Bowden et al. ...................... | 24/277 |
| 4,372,017 | 2/1983 | Heckethorn ..................... | 285/420 X |

FOREIGN PATENT DOCUMENTS

| | | | |
|---|---|---|---|
| 2906728 | 8/1979 | Fed. Rep. of Germany ...... | 285/420 |
| 2491163 | 4/1982 | France . | |
| 1511094 | 5/1978 | United Kingdom . | |

*Primary Examiner*—Thomas F. Callaghan
*Attorney, Agent, or Firm*—Lewis H. Eslinger

[57] ABSTRACT

The present invention relates to a clamp fitting for pipes, wherein the transverse plane ($P_1$) of symmetry of the strap is offset, with respect to the transverse plane ($P_2$) of symmetry of the staple, by a distance (d) oriented in the same direction as the one from the bottom of the forks towards their lateral opening.

2 Claims, 2 Drawing Figures

CLAMP FITTING FOR PIPES

The present invention relates to a clamp fitting for pipes.

French Pat. No. 2 491 163 describes a clamp fitting, particularly for exhaust pipes of automobile vehicles, comprising a staple in the form of a stirrup with divergent arms and an incurved strap whose ends, in the form of laterally open forks, constitute housings for said arms of the staple. Said arms are provided at their ends with stops of which at least one is adjustable, thus allowing the fitting to be clamped by at least one of said forks sliding on the corresponding arm of the staple.

Although the use of the fitting described in the above-mentioned Patent is entirely satisfactory, manufacture of the strap has proved to be relatively expensive. In fact, taking into account the shapes and particularities of this strap, as described in the above-mentioned Patent, it is necessary to effect a first operation generally by drop forging, i.e. by cold impact forging, to obtain the median part and a blank of the two terminal forks.

A subsequent machining then makes it possible to effect spot facing of the terminal faces of the forks coming into contact with the stops of the ends of the staple and, more particularly, the heels or elements in relief generally provided on these terminal faces.

This subsequent strap machining operation is obviously expensive and it seemed advantageous to seek to eliminate it without the risk of diminishing the efficacy and reliability of the considerable clamping which may be obtained by means of the fitting under the conditions already described in the above-mentioned Patent.

To this end, according to the invention, the plane $P_1$ perpendicular to the axis of the fitting and passing through the centre of gravity of the incurved median part of the strap is offset with respect to the plane $P_2$ defined by the axes of the arms of the staple when they occupy their normal position, at the moment of clamping, in the forks provided at the ends of the strap. The offset of said plane $P_1$ with respect to said plane $P_2$ is oriented in the same direction as that leaving the bottom of the forks towards their lateral opening.

Thanks to this arrangement, it is possible to produce the strap and, more particularly, its forks in one so-called raising operation, similar to an embossing, from a blank of cut out sheet metal of suitable thickness. The terminal faces of the forks are, from the end of the raising operation, adapted to abut on the stops of the staple. In addition-and this already justifies the interest of the invention-the offset of the planes $P_1$ and $P_2$ avoids any escape of the stops at the beginning of clamping of the fitting, thus eliminating the necessity of the retaining heels on the terminal faces of the forks of the strap.

The invention will be more readily understood on reading the following description with reference to the accompanying drawings, in which.

Figure 1:
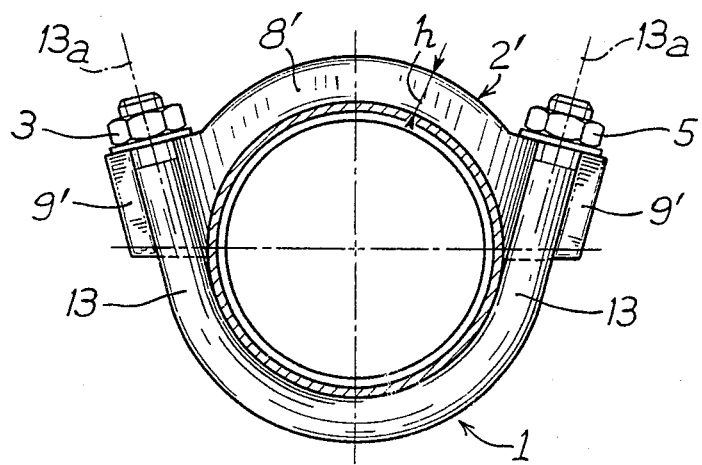
FIG. 1 is an end view of the fitting adapted around pipes.

The references already used in the above-mentioned Patent will designate the elements of the clamp fitting which have already been described therein and which are not modified by the present invention; on the contrary, the dash sign ' will be added to the references of the modified elements.

Referring now to the drawings, the clamp fitting comprises a staple 1 of which the divergent arms 13 presents stops 3 and 5, at least one of them, and preferably both, being constituted by a nut cooperating with a thread on the end of the corresponding arm.

The strap 2' comprises a median part 8' and two forks 9' presenting lateral openings 9a, on which the stops 3 and 5 may abut.

Figure 2:
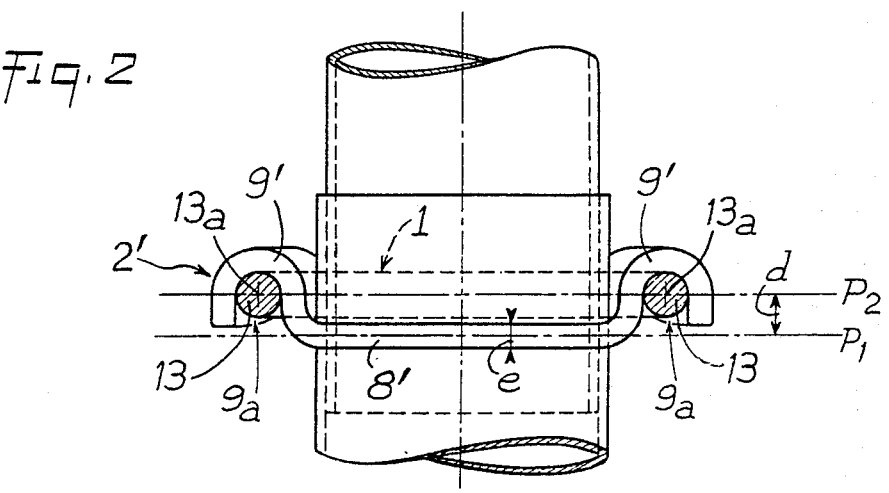
FIG. 2 is a plan view corresponding to FIG. 1, but with the stops of the staple having been removed.

Plane $P_1$ perpendicular to the axis of the fitting and of the pipes to be clamped and passing through the centre of gravity of the median part 8' of the strap 2' will now be considered. In practice, plane $P_1$ is the transverse plane of symmetry of the median part 8'. As is clearly seen in FIG. 2, this plane $P_1$ is offset by a distance d oriented with respect to the plane $P_2$ defined by the axes 13a of the arms 13 of the staple 1, i.e. in practice the transverse plane of symmetry of the staple. However, it should be noted that the offset d is considered when the arms 13 of the staple occupy their normal position, at the moment of clamping, in the forks 9' and that this offset is oriented in the same direction as the one from the bottom of the forks 9' towards their lateral opening 9a.

The fitting is positioned in the manner already described in the above-mentioned Patent but, thanks to the arrangements which have just been specified, there is no risk of escape of the strap at the beginning of clamping despite the absence of any retaining heel cooperating with the stops of the staple.

As has already been indicated, the strap 2' is formed by raising or embossing from a blank of sheet metal, so that the cross section of the median part 8' is rectangular or substantially rectangular. However, as may be realised from the drawing, the thickness e of the median part 8' is clearly less than its radial dimension h, this promoting both the desirable robustness and deformability of the strap and a limited surface of contact with the outer pipe to be clamped. The advantages of these latter two features have been set forth in the above-mentioned Patent and it appears unnecessary to specify them again.

The invention is, of course, not limited to the embodiment described and shown, but, on the contrary, covers all the equivalent variants thereof.

What is claimed is:

1. In a clamp fitting for pipes, particularly for exhaust pipes of automobile vehicles, comprising a staple in the form of a stirrup with divergent arms, stops being provided towards the ends of the arms of this staple, at least one of these stops being constituted by a nut screwed on a thread of the arm of the staple, and a strap presenting a median part of incurved form, provided towards its ends with laterally open forks and abutting on the end stops of the arms of the staple, the plane ($P_1$) perpendicular to the axis of the fitting and passing through the centre of gravity of the incurved median part of the strap is offset with respect to the plane ($P_2$) defined by the axes of the arms of the staple when they occupy their normal position, at the moment of clamping, in the forks provided at the ends of the strap, the offset of said plane ($P_1$) with respect to said plane ($P_2$) being oriented in the same direction as that from the bottom of the forks towards their lateral opening.

2. The clamp fitting of claim 1, wherein the median part of the strap presents a rectangular or substantially rectangular cross section, the thickness of this median part preferably being less than its radial dimension.

* * * * *